United States Patent [19]
Sugiura et al.

[11] Patent Number: 4,556,285
[45] Date of Patent: Dec. 3, 1985

[54] REFLECTION MIRROR FOR OPTICAL INSTRUMENT

[75] Inventors: Yoji Sugiura; Hironori Yamamoto; Keijiro Nishida, all of Kanagawa; Naoki Shirai, Saitama; Kimio Takahashi, Tokyo; Mikio Nakasugi, Tokyo; Norihisa Saito, Tokyo, all of Japan

[73] Assignee: Canon Kabushiki Kaisha, Tokyo, Japan

[21] Appl. No.: 591,233

[22] Filed: Mar. 19, 1984

Related U.S. Application Data

[63] Continuation of Ser. No. 344,004, Jan. 29, 1982, abandoned.

[30] Foreign Application Priority Data

Feb. 12, 1981 [JP] Japan .................................. 56-19505

[51] Int. Cl.⁴ ........................... G02B 5/08; G02B 7/18
[52] U.S. Cl. ................................. 350/600; 428/912.2; 428/938; 428/636; 428/654

[58] Field of Search ................ 350/288, 310; 428/938, 428/636, 654, 912.2; 427/162; 354/152

[56] References Cited

U.S. PATENT DOCUMENTS

| 2,058,429 | 10/1936 | Edwards | 350/288 |
| 3,063,138 | 11/1962 | Vandenburgh | 428/654 |
| 3,173,801 | 3/1965 | Lipkis et al. | 428/654 |
| 4,202,615 | 5/1980 | Nemoto | 354/152 |
| 4,358,507 | 11/1982 | Senaha et al. | 350/288 |

FOREIGN PATENT DOCUMENTS

| 9454 | 1/1977 | Japan | 350/288 |
| 600354 | 6/1978 | Switzerland | 350/288 |

Primary Examiner—Jon W. Henry
Attorney, Agent, or Firm—Toren, McGeady and Stanger

[57] ABSTRACT

In making reflection mirrors for optics, a technique is provided for making up a reflection mirror not of a glass-system material but of metallic material, and a method for high-precision mirror-machining of a metal plate is also disclosed.

4 Claims, 6 Drawing Figures

REFLECTION MIRROR FOR OPTICAL INSTRUMENT

This is a continuation of application Ser. No. 344,004, filed Jan. 29, 1982 and now abandoned.

BACKGROUND OF THE INVENTION

1. Field of the Invention:

This invention relates to a reflection mirror for optical instruments and particularly single lens reflex cameras.

2. Description of the Prior Art:

The conventional 45° mirror assembly has, as illustrated in FIG. 1, a polished-deposited glass 1 supported on a punched-and-formed metal plate 2 held in fixedly secured relation by an adhesive and further by retainer leaf springs 3 caulked to this plate 2. Mirror pivot shafts 4 and a mirror flip-up pin 5 are mounted on a pair of supplementary members 6 which are in turn caulked to the plate 2. Thus, as regards the essential parts alone, the mirror assembly necessitates 14 components and involves a very complicated form. Then, the mirror in the rigidly secured state must be so flat as to be optically acceptable. To achieve this, not only the glass 1, but also the metal plate 2 is required to be machined to a high-precision flatness, thereby giving rise to the disadvantage that the production cost is increased. When the glass is adhered, the adhesive when solidified shrinks causing deterioration of the flatness. Also as the ambient temperature changes, the difference between the thermal expansion coefficients of the glass and the metal contributes to a loss in the flatness, and as a result, the glass is often caused to peel off from the metal plate. Under very severe working conditions, a crack or similar phenomenon will appear in the glass.

SUMMARY OF THE INVENTION

It is an object of the present invention to provide a reflection mirror which makes it possible to eliminate the drawbacks that would otherwise result in the prior art from the increases in the number of assembly operations caused by use of a great number of components and of machining operations because of the inclusion of many high-precision parts, which increases contribute to an increase in the production cost, and wherein the required level of quality cannot be insured since the mirror is made up of glass and the fixedly secured positioning is effected mainly by using an adhesive.

DESCRIPTION OF THE PREFERRED EMBODIMENTS

Figure 1:
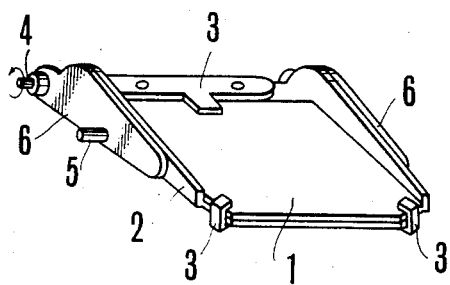
FIG. 1 is a perspective view of the conventional type of total reflection 45° mirror for a single lens reflex camera.
Figure 2:
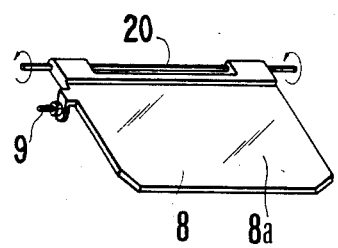
FIG. 2 is a perspective view of an embodiment of a reflection mirror according to the present invention applied as the total reflection 45° mirror for use in the single lens reflex camera.

FIG. 2 illustrates an embodiment of the present invention applied to a reflection mirror for a camera. A process for producing the mirror of FIG. 2 comprises the steps of: drawing a non-ferrous metal such as aluminium into a shape depicted in FIG. 3(a) to form a mirror 8, then bending, quenching, and perforating the mirror 8 to enable mounting of an actuator pin and shafts (FIG. 3(b)), then machining a reflection surface to a mirror finish, coating and then anti-reflection coating the back and side surfaces of the mirror 8 (FIG. 3(c)). As the raw material to be worked, use may be made of materials having more than 85% reflectance for white light (wavelengths 400 to 700 μm) at the angle of incidence of 45°. Taking into consideration light weight, versatility and production convenience, it is preferred to use copper, aluminium, nickel and their alloys.

In the embodiment of FIG. 2, the unified mirror body 8 includes a reception pin 9 for flipping the mirror upwards about a mirror rotation axis to position the mirror-machined mirror surface.

In a single lens reflex camera, when for light metering, the mirror 8 assumes the position of FIG. 2. Upon actuation of a camera shutter release, a lever movably mounted on the camera housing engages the pin 9, whereby the mirror is flipped upwards about a rotary shaft 20. Such upward rotative movement of the mirror is uniformly accelerated, reaching the fastest speed in the angle of rotation of about 45°. The time necessary for this is on the order of 0.1 to 0.2 seconds. At the terminal end of movement, it strikes a stopper with a large shock. Therefore, in the conventional case, peeling of the glass off the support plate, changing in position of the mirror, or cracking will occur. But in the case of the mirror of unified metal form of the invention, because of the absence of a cemented surface, such accidents never arise.

Further, when a change in the ambient temperature occurs in prior art devices, because of the difference between the thermal expansion coefficients of the metal (iron) and the glass is on the order of a multiple of 2, though the intervening adhesive layer has some buffering action, this leads to deterioration of the flatness due to the bimetal effect.

In the case of the unitary metal mirror of the invention, there is no deformation provided that the thermal treatment has been carried out at a higher temperature than the upper limit of ambient temperature by about 10° to 20° C. as in a quenching operation. Conversely, since a problem arises in the production run from the use of the adhesive layer which will contribute to a loss in the flatness, this too can be avoided by the construction of the unitary metal form.

Figure 3A:
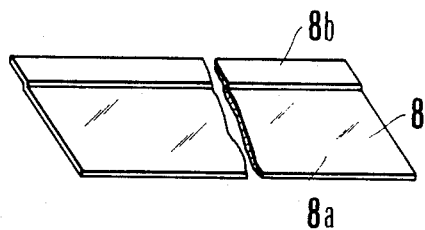
FIGS. 3a–c illustrate a process for producing the mirror of FIG. 2 with FIG. 3(a) being a perspective view of an extrusion made from a mirror raw material, FIG. 3(b) being a similar view of an article obtained from the punching operation with a press, and FIG. 3(c) being a similar view of the article after a bending operation by a press followed by a perforating operation.
Figure 3B:
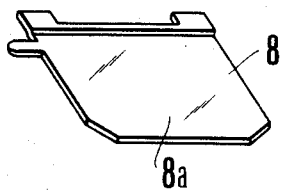
Figure 3C:
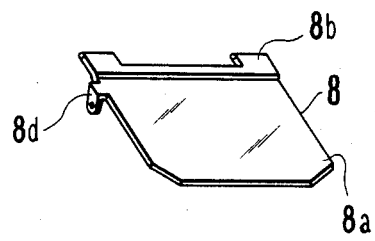

In connection with the manufacturing process as illustrated in FIGS. 3a–c, the extrusion is punched, bent, perforated and tapped by the usual metal machining means to obtain a mirror article, and in the final step, the article is mirror-machined and surface-coated to protect the mirrored surface. Thus, the necessary number of machining operations and assembly operations is remarkably reduced with the advantage that cost reduction can be achieved.

Next, the process from the step of drawing a metal material to the shape of FIG. 3a to the step of producing the mirror article of FIG. 3(c) is explained successively.

At first, as illustrated in FIG. 3(a), aluminium is drawn to a flat plate-like shape.

In FIG. 3(a), the plate or mirror member 8 has a thickened portion 8b and a thinned portion 8a. This is intended to enable interchangeability with the conventional glass mirror.

That is, the conventional glass mirror must be sufficiently thick, or otherwise sufficient strength could not be obtained. On the other hand, the metal mirror of the invention may be thinner because it is superior in strength to the glass mirror.

In order to hold the mirror 8 by hinge means in pivotal relation to the camera housing, the portion 8b is somewhat thickened. A flip-up pin part 8d is provided to receive a driving force to swing the plate.

The drawn plate member is punched in a mirror form illustrated in FIGS. 3(b) and 3(c) by pressing means.

The upper surface of the plate member machined as in FIG. 3(c) is to be treated to a mirror finish. This treatment includes surface-machining, washing and vacuum-depositing operations.

Figure 4:
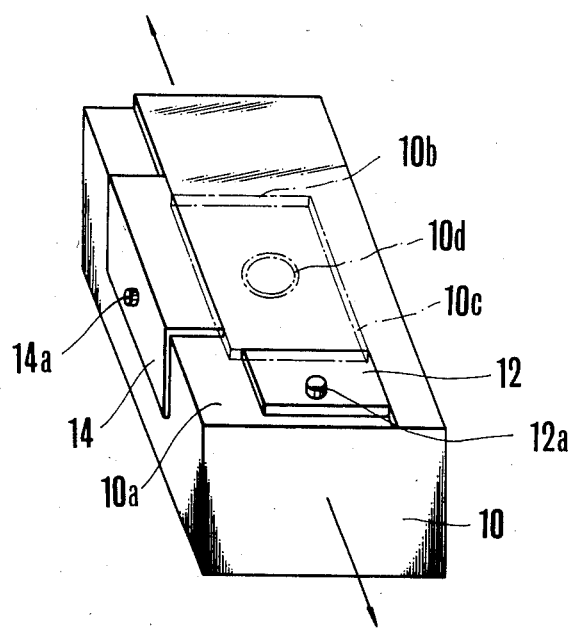
FIG. 4 is a perspective view of a fitting chuck for use in machining a metal plate to mirror finish according to the present invention.

FIG. 4 illustrates a work chucking device developed by the inventors in adaptation particularly to handle the upper surface of the metal plate to mirror finish.

The reflection mirror usable in the single lens reflex camera has a reflection area of about 25 mm × 35 mm with a thickness of 1 to 2 mm. And, the required degree of flatness is 1.5/1,000 mm, or five Newton's rings.

It is therefore very difficult to machine the surface of the mirror article held in the conventional work chucking means so accurately as to obtain that degree of flatness.

Thus, the present invention contemplates a work chucking device as illustrated in FIG. 4, and it has been found that the machined surface has the sufficient as-finished accuracy.

In FIG. 4, 10 is a work base on which is put the plate member 8 after the pressing operations until the aforesaid article of FIG. 3(c) have been completed.

This work base 10 has a platform 10a with the provision of abutments 10b and 10c against which the two sides of the plate member 8 are pressed. 12 and 14 are clamp members having lock screws 12a and 14a respectively by which the plate member 8 is held stationary in cooperation with the aforesaid abutments 10b and 10c.

Then, the plate member 8 after having been mounted on the platform 10a of the work base 10 is subjected to a machining operation. It is noted here that though the flatness of the platform 10a is accurately maintained, the front and back surfaces of the plate member 8 are not uniform as yet, are more or less uneven or undulate.

With such plate member 8 even when put on the platform 10a and tightened by the clamping members 12 and 14, it is impossible that the machining operation provides the sufficient flatness.

What is generally considered is to employ the vacuum sacking method of fixedly securing the plate member 8 to the platform 10a as a vacuum pump is connected to a plurality of conduct holes provided in the platform 10a.

This arrangement of the conduct holes seems at a glance to be effective, but has a problem that if the back surface of the plate member 8 is not finished within the predetermined tolerance of flatness, the machining of the front surface results in the failure of obtaining the required degree of flatness over the entire area of the plate 8.

With the aforesaid problem in mind, the present invention operates to employ a method by which the surface precision accuracy of metal material acceptable for the reflection mirror in the camera can be achieved. That is, an annular suction hole 10d is provided at an almost central portion of the area of the platform of the work base 10 on which the plate member 8 is placed. This suction hole 10d is connected to a vacuum pump (not shown) so that the plate member 8 is rigidly held on the platform 10a. At the same time when the vacuum starts, the clamping members 12 and 14 are operated to press the plate 8 against the abutments 10b and 10c.

Then, the work base 10 is mounted on a cutting machine (for example, milling machine), and, while being driven as a whole to reciprocally move in directions indicated by arrows, the front surface of the plate member 8 is cut by a cutter (not shown). It has been found that the use of the above-described plate chucking device makes it possible to obtain the aforesaid degree of flatness with the desired accuracy.

The aforesaid cutting operation is followed by a washing operation. This washing operation has the aim of removing oil and dust. This washing is carried out by furon solvent cleaner.

The thus-cleaned plate member is then subjected to a vacuum depositing treatment, whereby a reflection coating is applied on the aforesaid machined surface. As the vacuum evaporating agent use may be made of magnesium fluoride ($MgF_2$) for the 1st layer and cerium oxide ($CeO_2$) for the 2nd layer. The total thickness is about 1500Å. The thicknesses of the 1st and 2nd layers are so properly chosen as to provide the maximum reflectance.

The sequence of the foregoing operations completes the reflection mirror up to the finish. It is noted here that as an advantage of the use of metallic material in making up the reflection mirror mention may be made of the simplicity of back surface treatment of the reflection mirror. The conventional glass mirror requires that for light shielding purposes a black light-tight paper be adhered to the back surface of the mirror. In the case of the metal mirror, there is only need of applying a black coating, and therefore the production cost can be reduced.

In the art of reflection optical systems, it is generally conventional practice that the surface-coated glass plate be adhered to the metal base. As the flatness is caused to deteriorate by the adhesive, therefore, there is need for axial alignment and for other assembly arrangements to be readjusted later. Unlike this, the article of the invention is made up of metal which enables mirror cutting to provide a finish mirror surface, it being rendered possible for the as-machined accuracy to bring the mirror article to an on-optical axis position. Further in application under ordinary working conditions, pure aluminium may be used. If so, the surface coating can be omitted. Thus, the present invention has advantages in that the precision accuracy can be increased, while still lowering the production cost. Another advantage is that the mirror surface can be easily configured to an aspherical shape by which the number of constituent lens elements is reduced.

Still another advantage arising from the use of a mild metal in the mirror is that, since the adhering operation which is very uncertain is no longer necessary, the quality can be stabilized.

When is use, a shock, or temperature change does not lead to deterioration of the accuracy, or to the occurrence of peeling damage.

The parts in the assembly are very few and the number of close-tolerance parts is also lessened, and further the mirror itself is made amenable to very low unit-cost production techniques, thus contributing to a reduction in the production cost.

While a specific embodiment of the invention has been shown and described in detail to illustrate the application of the inventive principles, it will be understood that the invention may be embodied otherwise without departing from such principles.

What is claimed is:

1. A swinging reflective mirror for a camera comprising a mirror member consisting essentially of non-ferrous metallic material having a flat plate-like shape forming a planar flat part, a shaft supporting part which axially supports said planar plate part on a camera and a flip-up pin part having a recess for receiving a pin which is integrally formed with said planar plate part and which receives a driving force to swing said mirror member, said planar plate part consisting essentially of a part having undergone vacuum deposition treatment for convertng part into a reflection plane to reflect object luminous flux.

2. A swinging reflective mirror according to claim 1 wherein said nonferrous metallic material has a reflectance of at least 85% at an angle of incidence of 45° at wave lengths of between 400 to 700 nm.

3. A swinging reflective mirror according to claim 2 wherein said mirror member consists essentially of a drawn part with said planar plate part being formed with a thin shape and with said shaft supporting part being formed with a thickened shape.

4. A swinging reflective mirror according to claim 1 wherein said nonferrous metallic material is aluminum.

* * * * *